United States Patent
Newman

(10) Patent No.: US 7,533,202 B2
(45) Date of Patent: May 12, 2009

(54) SOFTWARE COMPATIBLE PARALLEL INTERFACE WITH BIDIRECTIONAL HANDSHAKING FOR SERIAL PERIPHERALS

(75) Inventor: Thomas Newman, Discovery Bay, CA (US)

(73) Assignee: Socket Mobile, Inc., Newark, CA (US)

( * ) Notice: Subject to any disclaimer, the term of this patent is extended or adjusted under 35 U.S.C. 154(b) by 473 days.

(21) Appl. No.: 11/102,208

(22) Filed: Apr. 9, 2005

(65) Prior Publication Data
US 2005/0198405 A1    Sep. 8, 2005

Related U.S. Application Data

(63) Continuation of application No. PCT/US03/29124, filed on Oct. 14, 2003.

(60) Provisional application No. 60/418,207, filed on Oct. 15, 2002.

(51) Int. Cl.
*G06F 13/12* (2006.01)

(52) U.S. Cl. .............................. 710/64; 710/62; 710/72

(58) Field of Classification Search ....................... None
See application file for complete search history.

(56) References Cited

U.S. PATENT DOCUMENTS

| 5,604,870 | A |   | 2/1997 | Moss et al. ................. 395/280 |
| 5,822,548 | A |   | 10/1998 | Story et al. |
| 5,884,102 | A | * | 3/1999 | England et al. ............... 710/62 |
| 6,845,420 | B2 | * | 1/2005 | Resnick ...................... 710/303 |

FOREIGN PATENT DOCUMENTS

| EP | 0 740 253 B1 | 7/2002 |
| EP | 1552403 B1 | 11/2007 |

OTHER PUBLICATIONS

Notification of Transmittal of the International Search Report or the Declaration; App. No. PCT/US03/29124; date of mailing Feb. 27, 2004; 6 pgs.
Texas Instruments, Inc.; TL 16PC564B, TL 16PC564BLV PCMCIA Universal Asynchronous Receiver Transmitter; SLLS225A—Mar. 1996—Revised Feb. 1998, Dallas Texas; 33 pgs.

(Continued)

*Primary Examiner*—Eron J Sorrell
(74) *Attorney, Agent, or Firm*—PatentVentures; Bennett Smith; Korbin Van Dyke

(57) ABSTRACT

High-speed reliable parallel data transmission between a computer and a parallel peripheral is provided by a peripheral controller by way of a virtual parallel UART (VPU). The VPU provides a novel parallel interface for higher speed parallel interface operation. The VPU is included in the peripheral controller along with a conventional RS-232 UART. The peripheral-side interface of the peripheral controller provides full bidirectional handshaking with the parallel peripheral. The host-side interface of the peripheral controller provides a legacy serial port compatible interface. Mode information selectively configures operation in either a VPU (parallel) or a UART (serial) mode. Both modes appear identical to software executing on the computer, enabling the use of standard serial I/O drivers without modification, and providing transparent legacy mode compatibility even when the hardware is configured for VPU mode.

30 Claims, 4 Drawing Sheets

OTHER PUBLICATIONS

National Semiconductor Corporation; PC16550D Universal Asynchronous Receiver/Transmitter with FIFOs; Jun. 1995; 22 pgs.

Excel Spreadsheet of Feb. 23, 2008 identifying references used to reject claims in related applications.

File History of EP 03 759 268.0 (ultimately issued as EP 1552403 B1).

International Preliminary Examination Report; App. No. PCT/US03/29124; date of completion Mar. 3, 2005; 3 pgs.

* cited by examiner

SOFTWARE COMPATIBLE PARALLEL INTERFACE WITH BIDIRECTIONAL HANDSHAKING FOR SERIAL PERIPHERALS

BACKGROUND

This invention is related to parallel peripheral interface capabilities for computer hosts.

Portable computer hosts, including handheld computing devices, notebook-sized computing devices, and similar reduced form-factor computing platforms, typically allow for expansion capabilities via couplings (slots, sleeves, or other similar mechanical structures) for mating expansion cards, modules, or other similar form-factor expansion resources. One important class of expansion capabilities includes peripheral interfaces. The host is typically restricted from providing a rich set of peripheral interfaces, due to weight, cost, size, or other physical limitations. Thus expansion capabilities to add or enhance peripheral interface resources to these hosts are an important area of development.

UART and RS-232 Standards

The RS-232 serial communication standard is described in document TIA/EIA-232F, "Interface Between Data Terminal Equipment and Data Circuit-Terminating Equipment Employing Serial Binary Data Interchange (ANSI/TIA/EIA-232-F-1997)", Sep. 1, 1997, Telecommunications Industry Association, 2500 Wilson Blvd., Suite 300, Arlington, Va. 22201. RS-232 serial is used for communication with modems, printers, pointing devices, and other computing peripherals.

The IBM PC Compatible legacy serial port is well known in the art. A Universal Asynchronous Receiver/Transmitter (UART) compatible with this de-facto industry standard is the 16C450/16C550. A representative part is described in the datasheet for the PC16550D, June 1995, from National Semiconductor.

Host application and operating system access to RS-232 serial port resources is typically by way of intermediate lower-level software, including device drivers and BIOS layers. However, in the specific case of hosts compatible (at least in part) with the IBM PC standard, some applications and operating systems bypass these lower-level software layers and directly perform read and write accesses to specific hardware addresses corresponding to the so-called industry standard architecture (ISA) address range and bit-level register compatibility of legacy serial port interface hardware.

The bit-level register compatibility expected is according to the industry standard 16C450/16C550 UART and the associated ISA address blocks for COM1, 2, 3, and 4. Compatible operation also includes an interrupt capability, which is routed to an interrupt controller for further processing.

Table 1, below, summarizes the required UART register addressing and functionality. A portion of the register address decode is controlled by the most significant bit of the UART Line Control Register. This is the Divisor Latch Access Bit (DLAB) in the table, and an "x" in the column indicates the state of DLAB is ignored for the decoding of the particular row in the table.

TABLE 1

| DLAB | COM1 | COM2 | COM3 | COM4 | Register |
|---|---|---|---|---|---|
| 0 | 3F8 | 2F8 | 3E8 | 2E8 | UART receiver buffer register (RBR) - read only |
| 0 | 3F8 | 2F8 | 3E8 | 2E8 | UART transmitter holding register (THR) - write only |
| 1 | 3F8 | 2F8 | 3E8 | 2E8 | UART divisor latch LSB (DLL) |
| 0 | 3F9 | 2F9 | 3E9 | 2E9 | UART interrupt enable register (IER) |
| 1 | 3F9 | 2F9 | 3E9 | 2E9 | UART divisor latch MSB (DLM) |
| x | 3FA | 2FA | 3EA | 2EA | UART interrupt identification register (IIR) - read only |
| x | 3FA | 2FA | 3EA | 2EA | UART FIFO control register (FCR) - write only |
| x | 3FB | 2FB | 3EB | 2EB | UART line control register (LCR) |
| x | 3FC | 2FC | 3EC | 2EC | UART modem control register (MCR) - bit 5 read only |
| x | 3FD | 2FD | 3ED | 2ED | UART line status register (LSR) |
| x | 3FE | 2FE | 3EE | 2EE | UART modem status register (MSR) |
| x | 3FF | 2FF | 3EF | 2EF | UART scratch register (SCR) |

Expansion Card Standards

Two of the most popular industry standards for expansion cards and their associated expansion slots are the PC Card and the CompactFlash (CF) Card. The PC Card has a 16-bit variant, previously known as a PCMCIA card, and a newer 32-bit variant, also known as a Card-Bus card. The following references provide further information on the PC Card and CF Card standards:

CFA, CF+ and CompactFlash Specification, Revision 1.4, www.compactflash.org, CompactFlash Association, P.O. Box 51537, Palo Alto, Calif. 94303;

CFA, CF+ and CompactFlash Specification, Revision ATA Compatibility Working Group Draft 0.1, www.compactflash.org, CompactFlash Association, P.O. Box 51537, Palo Alto, Calif. 94303;

PCMCIA, PC Card Standard, March 1997, www.pc-card.com, Personal Computer Memory Card International Association, 2635 North First Street, Suite 209, San Jose, Calif. 95134; and Design Guidelines for PC Card and CardBus, Addendum to PC 2001 System Design Guide, Version 1.1, Apr. 12, 2000, Intel Corporation and Microsoft Corporation.

SUMMARY

High-speed reliable parallel data transmission between a computer and a parallel peripheral is provided by a peripheral controller by way of a virtual parallel UART (VPU). The VPU provides a novel parallel interface for higher speed parallel interface operation. The VPU is included in the peripheral controller along with a conventional RS-232 UART. The peripheral-side interface of the peripheral controller provides full bidirectional handshaking with the parallel peripheral. The host-side interface of the peripheral controller provides a legacy serial port compatible interface. Mode information selectively configures operation in either a VPU (parallel) or a UART (serial) mode. Both modes appear identical to software executing on the computer, enabling the use of standard serial I/O drivers without modification, and providing transparent legacy mode compatibility even when the hardware is configured for VPU mode. A first bus interface mode provides for coupling to a host computer. A second bus interface mode provides for coupling to a host computer via an intermediary bus interface. This enables use as a replacement for an existing stand-alone UART component, while providing improved performance parallel interface capabilities. Pin configuration logic provides for combining pins between the VPU and UART interfaces, reducing pin count. Shared internal resources are used in both the VPU and UART modes, including receive and transmit FIFOs, reducing cost. The full peripheral-side handshaking provided in VPU mode guarantees reliable high speed operation, including elimination of FIFO errors and prevention of data sampling errors.

Operation in VPU mode provides higher bandwidth than that available from an RS-232 serial interface. Data transfer handshaking includes a full two-way handshake with the coupled parallel peripheral, allowing the peripheral and the peripheral controller to participate in the handshake. This capability is included in the VPU receiver and VPU transmitter, providing for symmetrical capabilities in both data transfer directions.

A dedicated parallel bus couples the parallel peripheral to the interface in VPU mode. The bus data lines are dedicated to data transfer between the parallel peripheral and the interface (separate couplings are provided for handshaking), enabling higher performance than a bus including polling accesses or accesses to other resources.

Dynamic switching between VPU and UART modes is possible, and transparent to the host-side of the peripheral interface. Therefore, flexible system configurations for dynamic coupling to either a legacy RS-232 serial peripheral, or alternatively for coupling to a higher-performance parallel peripheral, are made possible by the invention.

Legacy serial port bit-level compatible register interfacing is provided in VPU and UART modes, and thus there is no device driver software development required, and no modification required to the software executing on the host.

DETAILED DESCRIPTION

System

Figure 1:
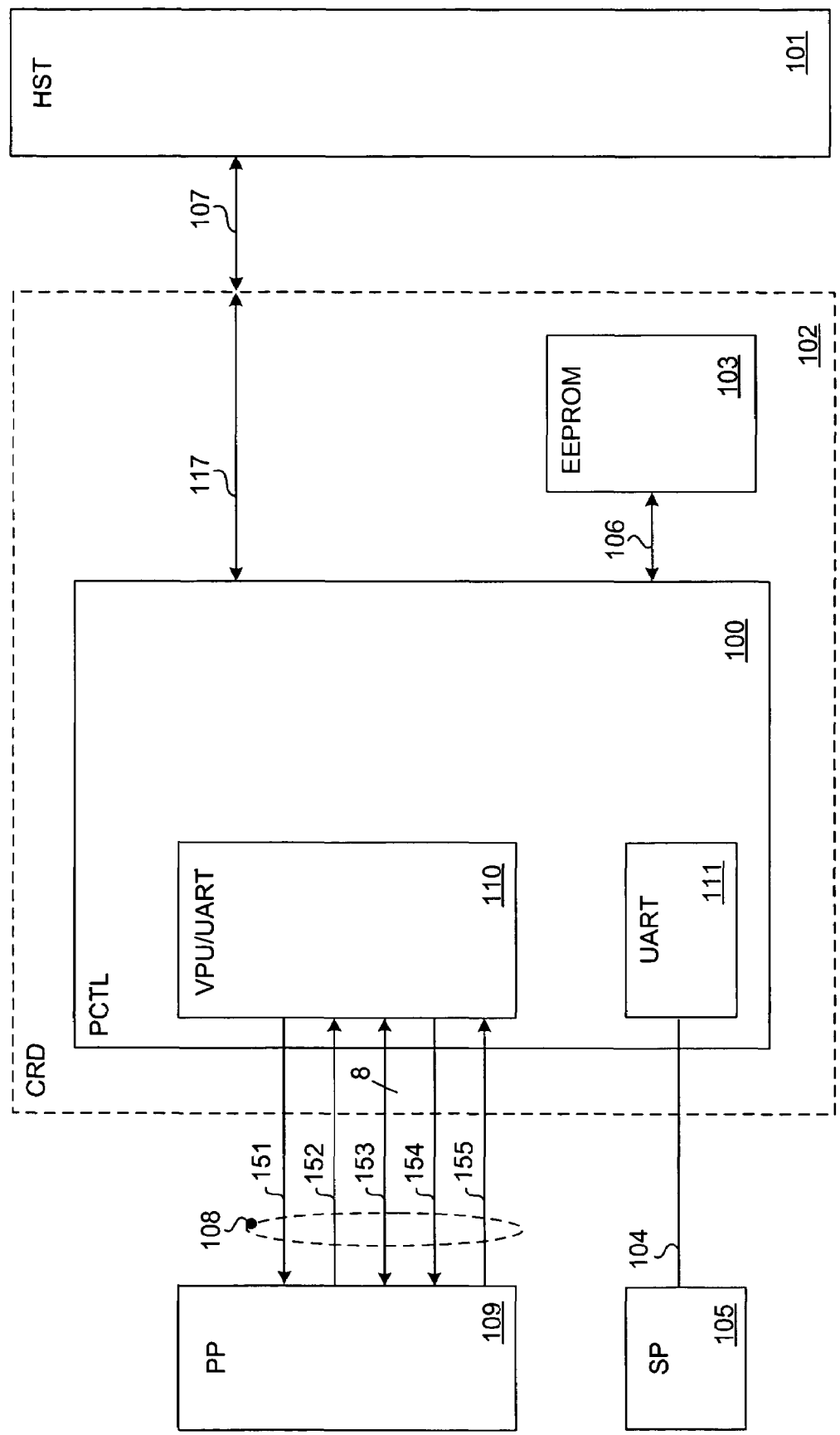
FIG. 1 is a block diagram of a system in accordance with the present invention.

FIG. 1 (see Table 2, below) is a block diagram of a system in accordance with the present invention. Expansion host 101 may be any computing device with expansion card or module capability compatible with expansion card 102, such as a PDA, pocket computer, notebook computer, or other portable host. Expansion card 102 enhances the functions otherwise available in host 101 by providing peripheral interface capabilities when mated with host 101. While expansion card 102 may be any form factor and protocol compatible with host 101 and host expansion bus 107, including any type of card, module, or cartridge, in this illustrative embodiment it is a 32-bit PC Card.

Table 2 identifies and expands the mnemonics used in FIG. 1.

TABLE 2

| Associated ID No. | Mnemonic | Expanded Name |
|---|---|---|
| 100 | PCTL | Peripheral Controller |
| 101 | HST | Host |
| 102 | CRD | Card |
| 105 | SP | Serial Peripheral |
| 109 | PP | Parallel Peripheral |

Expansion card 102 includes peripheral controller 100 coupled to host expansion bus 107 via peripheral controller interface bus 117, and serial EEPROM 103, coupled via serial EEPROM bus 106. External to the card are two peripherals: parallel peripheral 109 and serial peripheral 105. Peripheral controller 100 includes several modules. VPU/UART 110 is coupled to parallel peripheral 109 via VPU bus 108. UART 111 is coupled to serial peripheral 105 via serial bus 104. Expansion card 102 typically includes other components (not shown) such as a crystal or oscillator, and peripheral transceiver devices.

System Operation

In operation, expansion card 102 is mated with expansion host 101, and then either or both of parallel peripheral 109 and serial peripheral 105 are coupled to expansion card 102. Operating system and driver level software/firmware executing on host 101 provide application level interfaces to enable applications executing on host 101 to access parallel peripheral 109 and serial peripheral 105, via the capabilities provided by expansion card 102.

Serial peripheral 105 is an industry standard RS-232 serial peripheral. Parallel peripheral 109 is a parallel interface peripheral, with improved transfer bandwidth and latency compared to the highest baud rate RS-232 peripheral. However, both the parallel and serial peripherals appear to host 101 as serial peripherals coupled to de-facto industry standard legacy serial ports, due to the operation of VPU/UART 110. This enables expansion host 101 to use existing RS-232 compatible legacy serial port driver software, rather than specially adapted drivers, and still benefit from the performance advantages of VPU bus 108 and VPU/UART 110.

As illustrated in FIG. 1, VPU bus 108 comprises several elements. VPU_D[7:0] 153 is an eight-bit bi-directional parallel data transfer bus for communicating a data byte between peripheral controller 100 and parallel peripheral 109. VPU_RX_RDY# 151 is a ready handshake indicator from peripheral controller 100 indicating to parallel peripheral 109 that there is space in the peripheral controller for at least one additional data byte. VPU_WR# 152 is a write strobe from parallel peripheral 109 indicating that data is available on VPU_D[7:0] 153 for sampling by peripheral controller 100. VPU_TX_DA# 154 is a ready handshake indicator from peripheral controller 100 indicating to parallel peripheral 109 that there is at least one data byte ready for transmission to the parallel peripheral. VPU_RD# 155 is a read strobe from parallel peripheral 109 for requesting transmission of a data byte from peripheral controller 100 on VPU_D[7:0] 153.

Peripheral controller 100 supports two bus protocol modes on peripheral controller interface bus 117: Cardbus and Module modes. Cardbus mode provides for coupling of peripheral controller interface bus 117 to host expansion bus 107, as illustrated in FIG. 1. Module mode provides for indirect coupling of interface bus 117 to host expansion bus 107 via a bus interface external to peripheral controller 100. Those of ordinary skill in the art will understand how to use peripheral controller 100 in Module mode and adapt expansion card 102 to alternate embodiments for operation with such a bus interface external to peripheral controller 100. Thus peripheral controller 100 may be used in application scenarios to replace an existing sub-system configured for compatibility with a modified protocol on peripheral controller interface bus 117. This then provides a legacy serial port compatible interface, on the host side, to a parallel peripheral.

Further, VPU/UART 110 supports two modes of operation: VPU mode and conventional UART mode. VPU mode, as illustrated in FIG. 1, provides for coupling a parallel peripheral to the peripheral controller. UART mode provides for coupling a conventional serial peripheral to the peripheral controller. Those of ordinary skill in the art will readily understand how to adapt expansion card 102 for alternate embodiments supporting dynamic coupling of either a parallel or a serial peripheral to VPU/UART 110.

An illustrative embodiment of expansion card 102 is a 32-bit PC Card. Those of ordinary skill in the art will recognize peripheral controller 100 may also be used on a 16-bit PC Card, a CF Card, or any other similar expansion card, module or cartridge compatible with the Cardbus or Module modes of interface bus 117. Further, the invention is not restricted to the physical configurations of a PC Card or CF Card and their associated host mating structures. Other techniques for mating the card to the host are possible, including insertion into a sleeve or similar adapter for augmenting the expansion capabilities of the host.

Furthermore, the invention is not restricted to use on an expansion card for insertion into a host. The peripheral controller may be incorporated in any way into any computing system benefiting from the capability of a parallel peripheral interface with host-side legacy serial port compatibility.

Host

Host 101, as previously described, may be any of a number of portable computing devices compatible with host expansion bus 107 and mated expansion card 102. No alterations or modifications are required to the host to enable operation with the expansion card, as long as the host provides a compatible operating environment. Host 100 includes conventional processing means for executing program instructions. These program instructions form software and firmware including applications, operating systems, service functions, and driver layer routines. No alterations to any of the software or firmware are required to enable operation with expansion card 102, including attached parallel peripheral 109. In an illustrative embodiment the host operating system is a Win32 based operating system (such as WinNT, Win2000, or WinXP). Other operating systems are equally applicable, including Win16 (such as Win95 or Win98), Linux, and PalmOS, or an other similar host operating system.

Application software typically operates at the highest level of abstraction with respect to peripherals. At increasingly lower levels of abstraction are the operating system, legacy serial device driver, and BIOS. BIOS directly reads and writes de-facto industry standard legacy serial port compatible interface registers in VPU/UART 110 and UART 111. However, some embodiments of legacy serial device drivers, operating systems, and even applications, may bypass these BIOS services, and directly communicate with these registers.

Peripheral Controller

Figure 2:
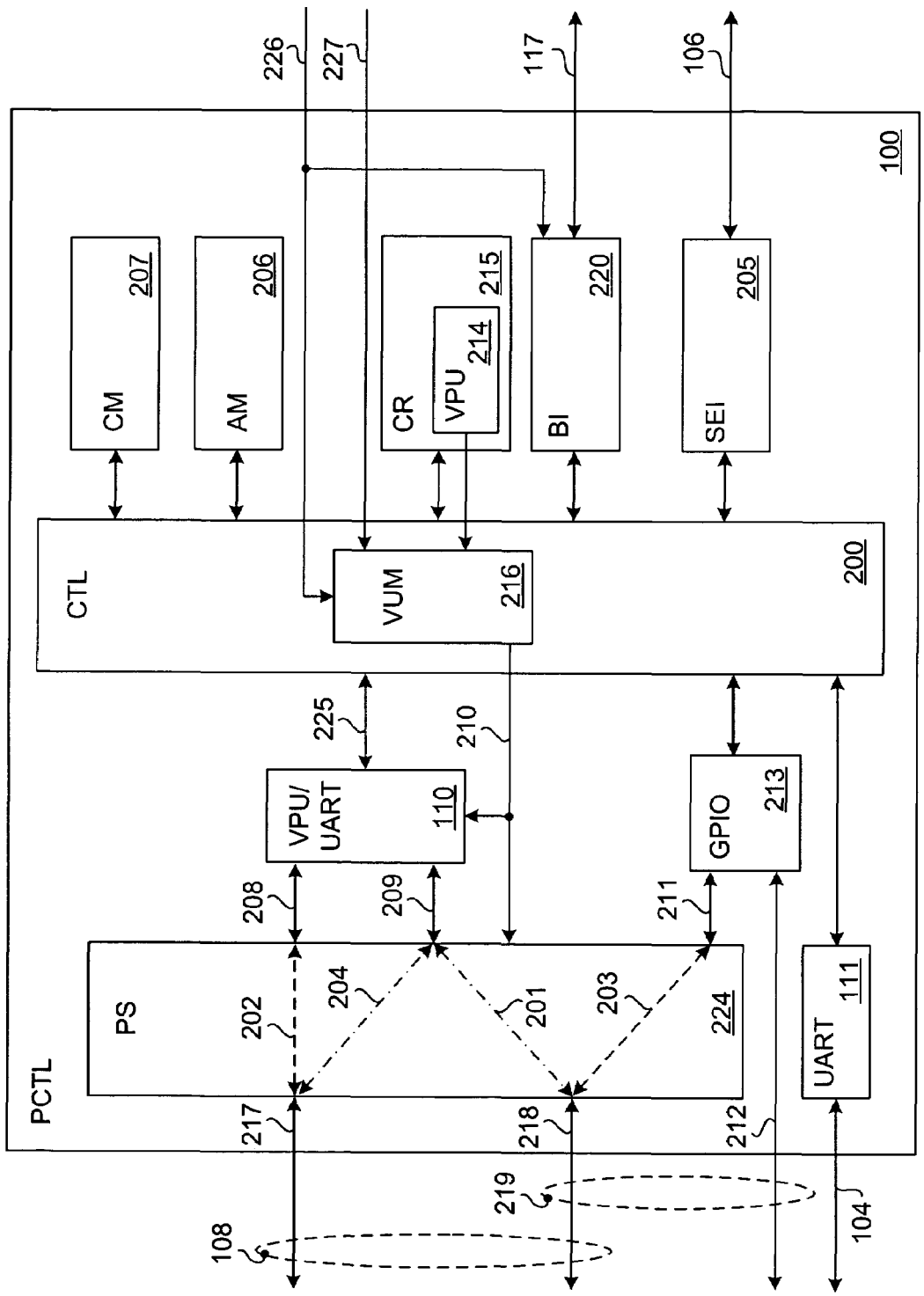
FIG. 2 is a block diagram of a peripheral controller in accordance with the present invention.

FIG. 2 (see Table 3, below) is a block diagram of peripheral controller 100 in accordance with the present invention. Peripheral controller 100 provides an interface between host 101 and one or more coupled peripherals. The first peripheral may be interfaced in one of two modes: VPU or UART. In VPU mode, the coupled peripheral is a parallel peripheral, such as parallel peripheral 109. In UART mode, the coupled peripheral is an RS-232 serial peripheral. In an illustrative embodiment the second peripheral is an RS-232 serial peripheral, such as serial peripheral 105.

As previously mentioned, peripheral controller 100 may be used in a system in one of two bus modes: CardBus mode or Module mode. CardBus mode is selected by deassertion of module mode input 226. In CardBus mode peripheral controller interface bus 117 functions according to the host expansion bus standard.

Module mode is selected by assertion of module mode input 226. In Module mode peripheral controller interface bus 117 functions according to the protocol required by the expansion bus interface device external to peripheral controller 100.

Table 3 identifies and expands the mnemonics used in FIG. 2.

TABLE 3

| Associated ID No. | Mnemonic | Expanded Name |
| --- | --- | --- |
| 100 | PCTL | Peripheral Controller |
| 200 | CTL | Control |
| 201 | BI | Bus Interface |
| 205 | SEI | Serial EEPROM Interface |
| 207 | CM | Common Memory |
| 208 | AM | Attribute Memory |
| 215 | CR | Configuration Registers |
| 216 | VUM | VPU/UART Mode Select |
| 224 | PS | Pin Sharing |

Peripheral controller 100 includes control logic 200 coupled to several other blocks: expansion bus interface 220, configuration registers 215, VPU/UART 110, pin sharing block 224, GPIO block 213, UART 111, serial EEPROM interface 205, expansion attribute memory block 206, and expansion common memory block 207.

In CardBus mode, selected by deassertion of module mode input 226, expansion bus interface 220 interfaces peripheral controller 100 to the host on peripheral controller interface bus 117 by providing low-level logic and protocol functions compatible with the standard host expansion bus. In Module mode, selected by assertion of module mode input 226, expansion bus interface 220 provides modified low-level logic and protocol functions on peripheral controller interface bus 117 appropriate for coupling to an external expansion bus interface device.

Serial EEPROM interface 205 interfaces peripheral controller 100 to a serial EEPROM via serial EEPROM bus 106. Expansion attribute memory block 206 and expansion common memory block 207 each include volatile read-write memory and associated access circuitry for coupling to control logic 200. These memories are available for processing functions performed by control logic 200, and are typically available for access by host 101 via expansion bus interface 220 and control logic 200.

GPIO block 213 provides conventional general purpose bit-level input/output (GPIO) capability for controlling other components coupled to peripheral controller 100 on expansion card 102. For clarity these other components are not shown in FIG. 1, but are easily understood by those of ordinary skill in the art. The couplings from GPIO block 213 to components external to peripheral controller 100 are divided into two groups: partial GPIO bus 212 and shared GPIO bus 211. As described in more detail below, partial GPIO bus 212 is always coupled externally via pins of peripheral controller 100. However, shared GPIO bus 211 is available externally only in UART mode.

UART 111 provides conventional industry standard legacy serial port serial-to-parallel and parallel-to-serial UART functions. VPU/UART 110 operates in one of two modes of operation: bidirectional parallel-to-parallel VPU mode, and industry standard legacy serial port serial-to-parallel and parallel-to-serial UART mode. The register-level command and status interfaces provided by UART 111 and VPU/UART 110 are identical (other than the offset address of the register block) and both conform to the legacy serial port standard. The couplings from VPU/UART 110 to the pins of peripheral controller 100 are indirect via pin sharing block 224, to provide for VPU and UART modes. VPU/UART serial bus 208 couples the UART portion of VPU/UART 110 to pin sharing block 224, while VPU/UART VPU bus 209 couples the VPU portion of VPU/UART 110 to pin sharing block 224.

Configuration registers 215 provide mode and control information specifying the operation of control logic 200, including VPU bit 214, coupled to VPU/UART mode select block 216 that is included in control logic 200. VPU/UART mode select block 216 further couples to module mode input 226 and STSCHG# input 227. VPU/UART mode select block 216 provides VPU mode indicator 210 to VPU/UART 110 and pin sharing block 224 to select between VPU and UART modes.

Pin sharing block 224 selectively couples VPU/UART 110 and GPIO block 213 to the pins of peripheral controller 100. VPU bus 108 is comprised of VPU/UART shared bus 217 and VPU/GPIO shared bus 218. Full GPIO bus 219 is comprised of VPU/GPIO shared bus 218 and partial GPIO bus 212.

Peripheral Controller Operation

The operation of peripheral controller 100 is as follows. Peripheral controller 100 is a slave providing two modes of master access via peripheral controller interface bus 117. CardBus mode is compatible with direct coupling to host expansion bus 107. Module mode is compatible with indirect coupling to host expansion bus 107 via an external expansion bus interface device. Expansion bus interface 220 receives bus requests (reset, read, write, and so forth) via peripheral controller interface bus 117 and passes these requests to control logic 200, following the bus mode determined by module mode input 226. Control logic 200 decodes each request, processing the request directly when it refers to a resource within control logic 200, and otherwise referencing configuration registers 215, VPU/UART 110, GPIO block 213, UART 111, serial EEPROM interface 205, expansion attribute memory block 206, or expansion common memory block 207 as appropriate.

Serial EEPROM interface 205 is a slave to control logic 200, and provides for access by control logic 200 or host 101 to external EEPROM 103 via serial EEPROM bus 106. Expansion attribute memory block 206 and expansion common memory block 207 are also slaves to control logic 200, responding to memory reference requests from control logic 200 or host 101. GPIO block 213 receives expansion host 101 read and write accesses via expansion bus interface 220 and control logic 200. In a conventional manner, GPIO block 213 processes these transactions and alters pin-state or returns pin-state accordingly.

UART 111 performs conventional serial-to-parallel and parallel-to-serial UART functions in accordance with the de-facto legacy serial port standard, interfacing an RS-232 serial peripheral to the host. This includes responding to expansion host 101 read and write requests via a register-level interface, and providing associated interrupt request processing. The read, write, and interrupt requests are coupled from expansion host 101 via expansion bus interface 220 and control logic 200. The register-level interface operates in at least one mode providing register-level interfacing compatible with the IBM PC compatible ISA addresses associated with legacy serial port resources.

VPU/UART 110, functioning independently and in parallel with UART 111, operates in one of two major modes: bidirectional parallel-to-parallel VPU mode, interfacing a parallel peripheral to the host, and legacy serial port compatible serial-to-parallel and parallel-to-serial UART mode, interfacing an RS-232 serial peripheral to the host. Operation in the UART mode is identical to UART 111. The register-level interface to the host operates using identical host-side interface protocols in UART and VPU modes. Identically to UART 111, the register-level interface operates in at least one mode providing register-level interfacing compatible with the IBM PC compatible ISA addresses associated with legacy serial port resources. VPU versus UART mode selection is determined by VPU mode indicator 210, coupled from VPU/UART mode select block 216. VPU/UART 110 provides two sets of outputs, VPU/UART serial bus 208 and VPU/UART VPU bus 209. VPU/UART serial bus 208 is active in UART mode, and provides all the peripheral-side signaling for coupling to an RS-232 serial peripheral. VPU/UART VPU bus 209 is active in VPU mode, and provides all the peripheral-side signaling for coupling to a parallel peripheral.

Peripheral controller 100 provides for coupling VPU/UART 110 to either a parallel peripheral 109 (VPU mode), or an RS-232 serial peripheral (UART mode), and pins are shared between these two modes. However, VPU bus 108 is 12 bits, and the standard RS-232 UART bus is only eight bits. The remaining four bits of VPU bus 108 are provided by sharing four bits of the GPIO pins. These shared pins correspond to shared GPIO bus 211 from GPIO block 213, and are only available for GPIO use in UART mode. Partial GPIO bus 212 corresponds to GPIO bits available in both VPU and UART modes.

VPU/UART mode select block 216 provides VPU mode indicator 210 to VPU/UART 110 and to pin sharing block 224. In operation, VPU/UART mode select block 216 examines VPU bit 214 in configuration registers 215, and two pins: module mode input 226 and STSCHG# input 227. VPU mode indicator 210 is asserted, indicating VPU mode, when both module mode input 226 and STSCHG# input 227 are asserted, or module mode input 226 is deasserted and VPU bit 214 is asserted.

Pin sharing block 224 selectively couples VPU/UART 110 and GPIO block 213 to the pins of peripheral controller 100 according to VPU versus UART mode, as indicated by VPU mode indicator 210. The coupling in VPU mode is illustrated in FIG. 2 by dashed arrows 204 and 201. Pin sharing block 224 couples a first portion of VPU/UART VPU bus 209 to VPU/UART shared bus 217 (dashed arrow 204), and a second portion of VPU/UART VPU bus 209 to VPU/GPIO shared bus 218 (dashed arrow 201), forming VPU bus 108. In this mode VPU/UART serial bus 208 and shared GPIO bus 211 are inactive. The coupling in UART mode is also illustrated in FIG. 2, by dashed arrows 202 and 203. Pin sharing block 224 couples VPU/UART serial bus 208 to VPU/UART shared bus 217 (dashed arrow 202) and shared GPIO bus 211 to VPU/

GPIO shared bus 218 (dashed arrow 203). In this mode VPU/ UART VPU bus 209 is inactive.

Table 4, below, summarizes the 12 bits of VPU bus 108, and also indicates the corresponding use of the coupling in UART mode.

TABLE 4

| VPU Mode Function | UART Mode Function |
| --- | --- |
| VPU_D[0] 153 | GPIO_4 |
| VPU_D[1] 153 | GPIO_5 |
| VPU_D[2] 153 | GPIO_6 |
| VPU_D[3] 153 | GPIO_7 |
| VPU_D[4] 153 | UART_TXD |
| VPU_D[5] 153 | UART_RXD |
| VPU_D[6] 153 | UART_DSR# |
| VPU_D[7] 153 | UART_DCD# |
| VPU_RX_RDY# 151 | UART_DTR# |
| VPU_WR# 152 | UART_RI# |
| VPU_TX_DA# 154 | UART_RTS# |
| VPU_RD# 155 | UART_CTS# |

Control logic 200 coordinates the overall global activities of peripheral controller 100, referencing configuration registers 215 and module mode input 226 as appropriate to determine the mode of operation. These activities include reset and initializing internal state, interrupt synchronization, and other related cooperative activities. Control logic 200 may be implemented with hardwired control structures, including multiple inter-communicating state machines or other logic blocks, or a more firmware oriented microcontroller style centralized control scheme, or any combination of these. Furthermore, those of ordinary skill in the art will recognize that some of the functions in control logic 200 may share logic with functions shown in expansion bus interface 220, configuration registers 215, VPU/UART 110, pin sharing block 224, GPIO block 213, UART 111, serial EEPROM interface 205, expansion attribute memory block 206, and expansion common memory block 207. In addition, expansion attribute memory block 206 and expansion common memory block 207 may share one or more storage arrays, access logic, or other hardware. The partitioning indicated in FIG. 2 is merely an illustrative organization and is not limiting with respect to the scope of the present invention.

FIG. 2 is only an illustrative embodiment. Those of ordinary skill in the art will recognize the invention may be used in peripheral controllers capable of interfacing parallel or serial peripherals and any number of additional peripherals in any configuration to a host. These additional peripheral interfaces may include a universal serial bus (USB) interface, a legacy parallel port interface, a network adapter, a bar-code scanner or other data acquisition device interface, or an interface to any other computing peripheral device. These functions may also be included on other embodiments of cards, modules, or cartridges similar to expansion card 102, or multi-function embodiments combining one or more of these or other capabilities. Any expansion card, module, or cartridge requiring flexible parallel and serial interface capability may be configured, by those of ordinary skill in the art, to use the present invention.

VPU/UART

Figure 3:
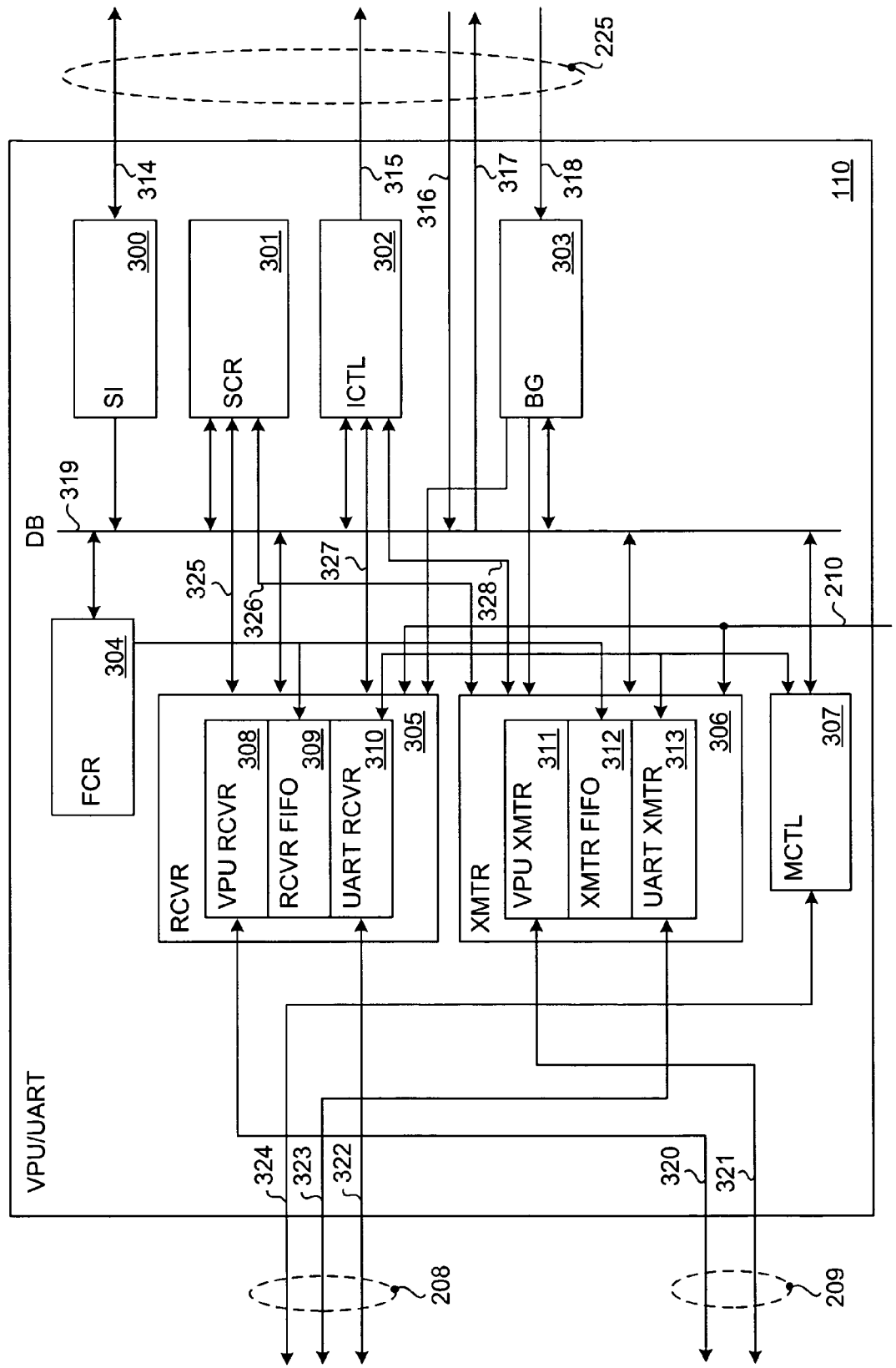
FIG. 3 is a block diagram of a combined Virtual Parallel UART (VPU) and UART, in accordance with the present invention.

FIG. 3 (see Table 5, below) is a block diagram of VPU/ UART 110, in accordance with the present invention. VPU/ UART 110 operates in one of two modes, providing either a bidirectional parallel-to-parallel interface (VPU mode) or an industry standard legacy serial port serial-to-parallel and parallel-to-serial interface (UART mode). Operation in either VPU or UART modes provides a slave host-side register-level interface, compatible with the IBM PC compatible ISA register addresses and interrupt signaling protocols associated with legacy serial port resources.

Table 5 identifies and expands the mnemonics used in FIG. 3.

TABLE 5

| Associated ID No. | Mnemonic | Expanded Name |
| --- | --- | --- |
| 300 | SI | System Interface |
| 301 | SCR | Status and Control Registers |
| 302 | ICTL | Interrupt Control |
| 303 | BG | Baud rate Generator |
| 304 | FCR | FIFO Control Registers |
| 305 | RCVR | Receiver |
| 306 | XMTR | Transmitter |
| 307 | MCTL | Modem Control |
| 308 | VPU RCVR | VPU Receiver |
| 309 | RCVR FIFO | Receiver FIFO |
| 310 | UART RCVR | UART Receiver |
| 311 | VPU XMTR | VPU Transmitter |
| 312 | XMTR FIFO | Transmitter FIFO |
| 313 | UART XMTR | UART Transmitter |
| 319 | DB | Data Bus |

VPU/UART 110 includes system interface block 300, status and control registers 301, interrupt control logic 302, baud rate generator 303, FIFO control registers 304, VPU/UART receiver 305, VPU/UART transmitter 306, and modem control block 307. These blocks are all coupled via VPU/UART internal data bus 319. Status and control registers 301, interrupt control logic 302, and baud rate generator 303 are also independently coupled to VPU/UART receiver 305 and VPU/ UART transmitter 306.

VPU/UART receiver 305 includes VPU receiver 308, receiver FIFO 309, and UART receiver 310. VPU/UART transmitter 306 includes VPU transmitter 311, transmitter FIFO 312, and UART transmitter 313. Modem control block 307 is coupled to UART receiver 310 and UART transmitter 313. VPU/UART control coupling 225 provides for communication between VPU/UART 110 and control logic 200. Coupling 225 includes VPU/UART address and control bus 314, VPU/UART interrupt request 315, VPU/UART data input bus 316, VPU/UART data output bus 317, and VPU/ UART baud rate generator control input bus 318. VPU/UART address and control bus 314 is coupled to system interface block 300. VPU/UART interrupt request 315 is coupled to interrupt control logic 302. VPU/UART data input bus 316 and VPU/UART data output bus 317 are coupled to VPU/ UART internal data bus 319. VPU/UART baud rate generator control input bus 318 is coupled to baud rate generator 303.

VPU/UART VPU bus 209 provides for communication between VPU/UART 110 and parallel peripheral 109 (via intervening pin sharing block 224), and includes VPU receiver bus 320, and VPU transmitter bus 321. VPU receiver bus 320 is coupled to VPU receiver 308, and VPU transmitter bus 321 is coupled to VPU transmitter 311. VPU/UART serial bus 208 provides for communication between VPU/UART 110 and a serial peripheral (via intervening pin sharing block 224), and includes UART receiver bus 322, UART transmitter bus 323, and modem control bus 324. UART receiver bus 322 is coupled to UART receiver 310, UART transmitter bus 323 is coupled to UART transmitter 313, and modem control bus 324 is coupled to modem control block 307.

FIFO control registers block 304 is coupled to receiver FIFO 309 and transmitter FIFO 312. VPU mode indicator 210 is coupled to VPU/UART receiver 305 and VPU/UART transmitter 306.

System interface block 300 includes slave decoding resources to decode transactions received on VPU/UART address and control bus 314 and to pass the transaction and the decode information to VPU/UART internal data bus 319.

Slave responder blocks coupled to VPU/UART internal data bus 319 include status and control registers 301, interrupt control logic 302, baud rate generator 303, FIFO control registers 304, VPU/UART receiver 305, VPU/UART transmitter 306, and modem control block 307. Each of these blocks include register-level interface circuitry for communication via a master coupled to VPU/UART control coupling 225 (including expansion host 101 via expansion bus interface 220 and control logic 200). This register-level interface circuitry includes registers conforming to the format specified by the legacy serial port standard and other registers. The interface circuitry also includes access circuitry for responding to read and write requests communicated via VPU/UART internal data bus 319.

Status and control registers 301 includes legacy serial port standard status and control registers and associated control circuitry relating to VPU/UART receiver 305 and VPU/UART transmitter 306. In an illustrative embodiment, status and control registers 301 include registers functionally compatible with the LCR, LSR, and SCR registers of the 16C450/16C550. The control circuitry is responsive to transaction status information from VPU/UART receiver 305 and VPU/UART transmitter 306, and also provides control information to the receiver and transmitter.

Interrupt control logic 302 includes legacy serial port standard interrupt registers and associated interrupt circuitry to signal an interrupt via VPU/UART interrupt request 315. The associated interrupt circuitry operates in a manner compatible with the legacy serial port standard, including processing transaction status information from VPU/UART receiver 305 and VPU/UART transmitter 306. In an illustrative embodiment, interrupt control logic 302 includes registers functionally compatible with the IER and IIR registers of the 16C450/16C550.

Baud rate generator 303 includes legacy serial port standard compatible transmit and receive clock generation for use by VPU/UART receiver 305, and VPU/UART transmitter 306. This includes mode registers, clock dividers, and clock selectors, and control circuitry responsive to VPU/UART baud rate generator control input bus 318. In an illustrative embodiment, baud rate generator 303 includes registers functionally compatible with the DLL and DLM registers of the 16C450/16C550.

FIFO control registers block 304 includes legacy serial port standard compatible registers and other registers for storing FIFO control information relating to receiver FIFO 309 and transmitter FIFO 312. The FIFO control information provides for the selection of several modes, including one of four major modes of operation of receiver FIFO 309 and transmitter FIFO 312. (1) "450" mode, the default, compatible with the 16C450 and providing a one byte FIFO. (2) "550" mode, compatible with the 16C550 and providing a 16 byte FIFO. (3) "Enhanced 550" mode providing a 128 byte FIFO. (4) "Further Enhanced 550" mode providing a 512 byte FIFO. The "Enhanced 550" and "Further Enhanced 550" modes remain fully compatible with the 16C550 in all respects except the FIFO size. The FIFO mode selection information is coupled to receiver FIFO 309 and transmitter FIFO 312. In an illustrative embodiment, FIFO control registers block 304 includes a register functionally compatible with the FCR register of the 16C450/16C550.

VPU/UART receiver 305 includes several related blocks. Receiver FIFO 309 provides byte organized buffering for received data from a parallel or RS-232 serial peripheral. VPU receiver 308 provides parallel access from a parallel peripheral to receiver FIFO 309, via VPU receiver bus 320, including data transmission and handshaking. UART receiver 310 provides legacy serial port compatible UART serial access from an RS-232 serial peripheral to receiver FIFO 309 via UART receiver bus 322. RS-232 serial receiver handshaking is provided for in combination with modem control block 307. Further included are legacy serial port standard compatible registers associated with these blocks, and related control circuitry. In an illustrative embodiment, VPU/UART receiver 305 includes a register functionally compatible with the RBR register of the 16C450/16C550.

VPU/UART transmitter 306 includes several related blocks. Transmitter FIFO 312 provides byte organized buffering for data awaiting transmission to a parallel peripheral or an RS-232 serial peripheral. VPU transmitter 311 provides parallel access from transmitter FIFO 312, via VPU transmitter bus 321, to a parallel peripheral, including data transmission and handshaking. UART transmitter 313 provides legacy serial port compatible UART serial access from transmitter FIFO 312, via UART transmitter bus 323, to an RS-232 serial peripheral. RS-232 serial transmitter handshaking is provided for in combination with modem control block 307. Further included are legacy serial port standard compatible registers associated with these blocks, and related control circuitry. In an illustrative embodiment, VPU/UART transmitter 306 includes a register functionally compatible with the THR register of the 16C450/16C550.

Modem control block 307 provides legacy serial port compatible modem handshaking status and control signals, on modem control bus 324, according to the RS-232 standard. This includes handshaking for UART receiver 310 and UART transmitter 313. In an illustrative embodiment, modem control block 307 includes registers functionally compatible with the MCR and MSR registers of the 16C450/16C550.

VPU/UART Operation

In operation, VPU/UART 110 responds as a slave to accesses on VPU/UART control coupling 225. System interface block 300 decodes these accesses, activating status and control registers 301, interrupt control logic 302, baud rate generator 303, FIFO control registers 304, VPU/UART receiver 305, VPU/UART transmitter 306, or modem control block 307 as appropriate. Data is then communicated data via VPU/UART internal data bus 319. System interface block 300 also controls the coupling of VPU/UART data input bus 316 onto VPU/UART internal data bus 319 (write access) and VPU/UART internal data bus 319 onto VPU/UART data output bus 317 (read access). These accesses typically include programming of control and mode information, examination of status information, and communication of data to transmit to the coupled peripheral or data received from the coupled peripheral. These accesses typically originate from expansion host 101. The appropriate block responds to the access by accepting write data or providing read data, and modifying any control, mode, or status information as appropriate.

Status and control registers 301 provides the receive status of VPU/UART receiver 305 and transmit status of VPU/UART transmitter 306 to master requests via VPU/UART control coupling 225, including requests to the LCR, LSR, and SCR compatible registers. This includes information relating to data availability in the receiver FIFO, and space availability in the transmitter FIFO. Interrupt control logic 302 provides an interrupt on VPU/UART interrupt request 315 in various interrupt modes, including a mode providing an interrupt when at least one byte is available in receiver FIFO 309, or when at least one byte of space is available in transmitter FIFO 312. The interrupt processing is controlled and monitored by accessing bits in the IER and IIR compatible registers.

Expansion host 101, in a first illustrative scenario, polls status and control registers 301 to determine when receive data is available. In a second illustrative scenario, expansion host 101 relies on VPU/UART interrupt request 315 to determine when receive data is available. When receive data is available, expansion host 101 reads receiver FIFO 309 by reading the RBR compatible register in VPU/UART receiver 305. In a third illustrative scenario, expansion host 101 polls status and control registers 301 to determine when transmit FIFO space is available. In a fourth illustrative scenario, expansion host 101 relies on VPU/UART interrupt request 315 to determine when transmit FIFO space is available. When transmit FIFO space is available, and expansion host 101 has data ready for transmission, the host writes the data into transmitter FIFO 312 by writing the THR compatible register in VPU/UART transmitter 306.

Baud rate generator 303 provides the receive clock to VPU/UART receiver 305, and the transmit clock to VPU/UART transmitter 306, in a conventional manner. This includes processing based on VPU/UART baud rate generator control input bus 318, and various register bits in the included legacy serial port compatible baud rate generation registers, including the DLL and DLM compatible registers. These registers are typically programmed by expansion host 101.

FIFO control registers block 304 is also typically programmed by expansion host 101, including accesses to the FCR compatible register, and couples the FIFO mode select information to receiver FIFO 309 and transmitter FIFO 312, where it is used to determine which of the four major modes (described above) receiver FIFO 309 and transmitter FIFO 312 operate in. A single major mode selector controls both receiver FIFO 309 and transmitter FIFO 312, so both FIFOs operate in the same mode at any given time.

VPU/UART receiver 305 operates in one of two modes: VPU (for interfacing to a parallel peripheral) or UART (for interfacing to an RS-232 serial peripheral). The mode is selected by VPU mode indicator 210. In VPU mode, VPU receiver 308 is active and coupled to receiver FIFO 309, and UART receiver 310 is inactive. In UART mode, UART receiver 310 is active and coupled to receiver FIFO 309, and VPU receiver 308 is inactive.

VPU receiver 308 (active in VPU mode), via VPU receiver bus 320, communicates with parallel peripheral 109. A receiver FIFO space available ready handshake is provided, and a write strobe and associated data are accepted from parallel peripheral 109 (this operation is described in more detail below). Received data is stored a byte at a time in receiver FIFO 309, as the youngest available.

UART receiver 310 (active in UART mode) performs conventional serial-to-parallel conversion and associated handshaking, on UART receiver bus 322, according to the RS-232 standard. A portion of the handshaking is performed by modem control block 307. Received data is stored in receiver FIFO 309, as the youngest available.

In both VPU and UART modes, the status of receiver FIFO 309 is reflected to status and control registers 301 via coupling 325, and to interrupt control logic 302 via coupling 327. Status and control registers 301 and interrupt control logic 302 in turn provide this information via legacy serial port compatible registers and interrupt protocol. Receiver FIFO 309 responds to read requests from VPU/UART internal data bus 319, returning the oldest data byte available, for further coupling by system interface block 300 onto VPU/UART control coupling 225. Receiver FIFO 309 responds to FIFO mode selection from FIFO control registers 304, operating in one, 16, 128, or 512 byte mode as appropriate. Status information provided and FIFO request response are independent of whether the FIFO is operating in VPU or UART mode.

VPU/UART transmitter 306 operates in one of two modes: VPU (for interfacing to a parallel peripheral) or UART (for interfacing to an RS-232 serial peripheral). The mode is selected by VPU mode indicator 210. In VPU mode, VPU transmitter 311 is active and coupled to transmitter FIFO 312, and UART transmitter 313 is inactive. In UART mode, UART transmitter 313 is active and coupled to transmitter FIFO 312, and VPU transmitter 311 is inactive.

VPU transmitter 311 (active in VPU mode), via VPU transmitter bus 321, communicates with parallel peripheral 109. A transmitter FIFO data ready handshake and FIFO data are provided, and a read strobe is accepted from parallel peripheral 109 (this operation is described in more detail below). Data for transmission is read a byte at a time from transmitter FIFO 312, oldest available data first.

UART transmitter 313 (active in UART mode) performs conventional parallel-to-serial conversion and associated handshaking, on UART transmitter bus 323, according to the RS-232 standard. A portion of the handshaking is performed by modem control block 307. Transmitted data is read from transmitter FIFO 312, oldest first.

In both VPU and UART modes, the status of transmitter FIFO 312 is reflected to status and control registers 301 via coupling 326, and to interrupt control logic 302 via coupling 328. Status and control registers 301 and interrupt control logic 302 in turn provide this information via legacy serial port compatible registers and interrupt protocol. Transmitter FIFO 312 responds to write requests from VPU/UART control coupling 225 by way of system interface block 300 and VPU/UART internal data bus 319, storing the data byte as the youngest available. Transmitter FIFO 312 responds to FIFO mode selection from FIFO control registers 304, operating in one, 16, 128, or 512 byte mode as appropriate. Status information provided and FIFO request response are independent of whether the FIFO is operating in VPU or UART mode.

Modem control block 307 responds to read and write accesses via VPU/UART internal data bus 319 to read and write the state of various modem control signals on modem control bus 324, according to the legacy serial port and RS-232 standards. This includes accesses to the MCR and MSR compatible registers. Modem control block 307 receives UART receiver status (FIFO near full, for example) from UART receiver 310 and includes this in the processing for modem control bus 324. Modem control block 307 provides VPU/UART transmitter 306 with modem control information from modem control bus 324 (data carrier detect deasserted, for example).

Those of ordinary skill in the art will recognize that the partitioning between blocks in VPU/UART 110, as shown in FIG. 3, is only one possible embodiment. Alternate embodiments may repartition functions between blocks without modification to the operation of the present invention. For example, portions of status and control registers 301 may be combined with portions of VPU/UART receiver 305 and VPU/UART transmitter 306. Portions of interrupt control logic 302 may be combined with VPU/UART receiver 305 and VPU/UART transmitter 306. These alternative embodiments in no way alter the function of the present invention.

VPU Handshaking

VPU/UART 110 handshakes on the host-side with expansion host 101 and on the peripheral-side with either parallel peripheral 109 (VPU mode) or a serial peripheral (UART mode). This handshaking provides for reliable data communication between the host and the peripheral. The host handshake is according to the legacy serial port standard, by way of a register-level interface including an interrupt. From the perspective of the host, handshaking between VPU/UART 110 and expansion host 101 is identical in VPU and UART modes. As described previously, in handshaking with the receiver, the host may poll to determine when receive data is available, or wait for an interrupt indicating receive data is available. When data is available, the host reads it from receiver FIFO 309. In handshaking with the transmitter, the host may poll to determine when transmit FIFO space is available, or may wait for an interrupt indicating transmit FIFO space is available. When space is available, and the host has data ready for transmission, the host writes the data into transmitter FIFO 312. Host accesses from receiver FIFO 309 and to transmitter FIFO 312 are according to the legacy serial port standard. In an illustrative embodiment, this is by way of access to the RBR and THR compatible registers.

In UART mode, the peripheral-side handshake between peripheral controller 100 and the coupled serial peripheral is according to the legacy serial port standard, for both the receiver and the transmitter. In VPU mode, the peripheral-side handshake is by way of ready handshakes provided to parallel peripheral 109 by VPU/UART 110 and strobe information provided to VPU/UART 110 by parallel peripheral 109. The receiver peripheral-side handshaking is conventional. However, the transmitter peripheral-side handshaking is novel, as best realized by reference to FIG. 4.

Figure 4:
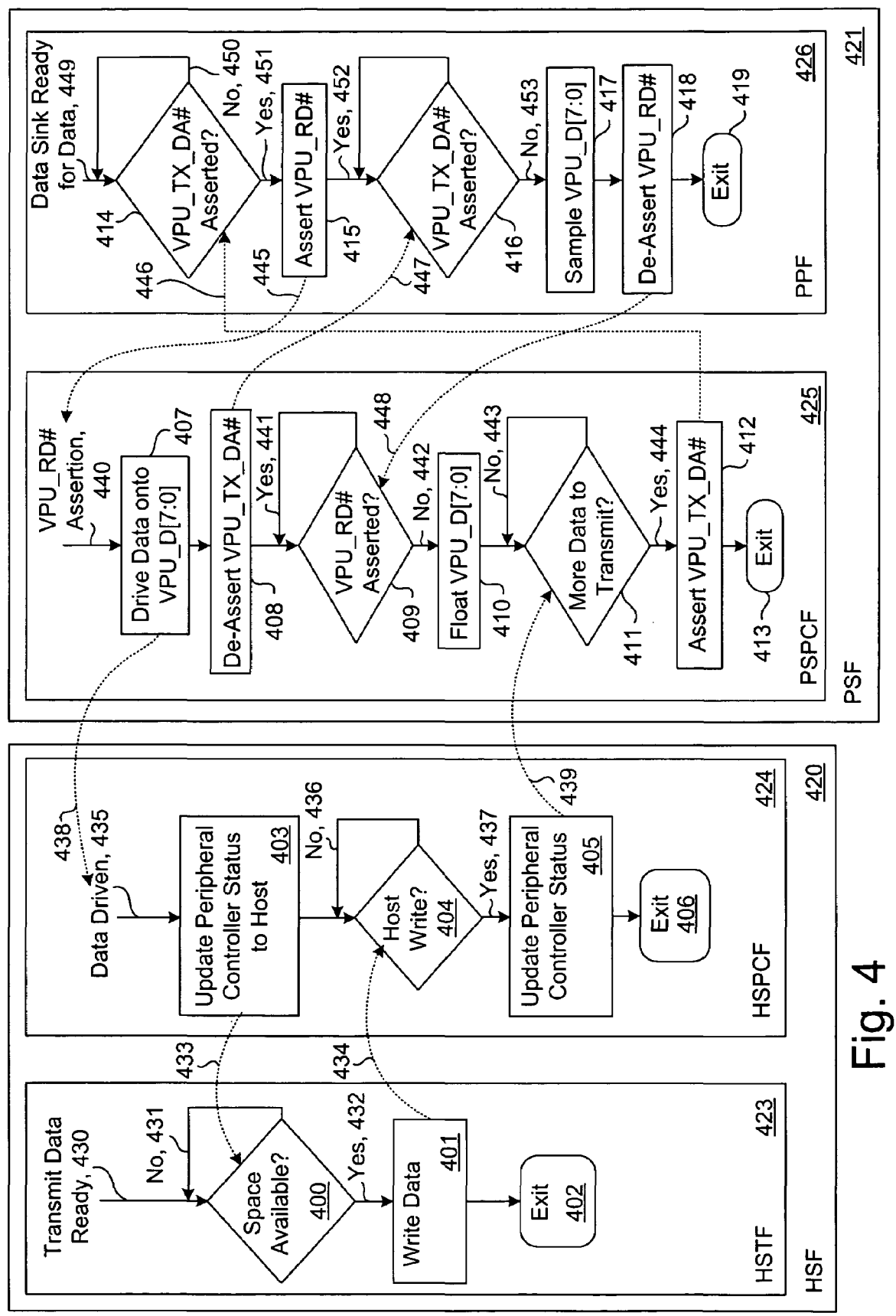
FIG. 4 is a flow diagram illustrating handshaking between a peripheral controller, a parallel peripheral, and a host, in accordance with the present invention.

FIG. 4 (see Table 6, below) is a flow diagram illustrating the end-to-end data communication from host 101 to coupled parallel peripheral 109, according to the present invention. Also shown are the associated handshaking events. Data moves from the host to the peripheral in two processes: first from the host to peripheral controller 100, illustrated in 420, and then from the peripheral controller to the peripheral, illustrated in 421. Handshaking is provided for each of these two data movements.

The objectives of the handshaking are to prevent underrun of transmitter FIFO 312, and to provide for reliable data sampling by parallel peripheral 109. To these ends, a transmitter ready handshake, VPU_TX_DA# 154, is provided from peripheral controller 100 to parallel peripheral 109. As will be described in more detail below, this signal is asserted when data is available in transmitter FIFO 312 for reading by parallel peripheral 109. Waiting for assertion of VPU_TX_DA# 154 before reading transmitter FIFO 312 prevents underrun of the FIFO by parallel peripheral 109. VPU_TX_DA# 154 is deasserted only after peripheral controller 100 has driven valid transmitter FIFO data onto VPU_D[7:0] 153. Waiting for deassertion of VPU_TX_DA# 154 before sampling VPU_D[7:0] 153 provides for reliable data sampling by parallel peripheral 109.

Table 6 identifies and expands the mnemonics used in FIG. 4.

TABLE 6

| Associated ID No. | Mnemonic | Expanded Name |
| --- | --- | --- |
| 420 | HSF | Host-Side Flow |
| 421 | PSF | Peripheral-Side Flow |
| 423 | HSTF | Host Flow |
| 424 | HSPCF | Host-Side Peripheral Controller Flow |
| 425 | PSPCF | Peripheral-Side Peripheral Controller Flow |
| 426 | PPF | Parallel Peripheral Flow |

The first process in the data movement is illustrated in host-side flow 420, including host flow 423 and host-side peripheral controller flow 424. Host flow 423 event "Transmit Data Ready" 430 occurs when host 101 has data ready for transmission to the coupled peripheral. Host 101, using the legacy serial port compatible polling or interrupt handshake previously described, determines when space for more data is available in peripheral controller 100. This occurs in process 400, where the host remains, as shown in path 431, until space is available. When space does become available, flow proceeds along path 432 to process 401. During process 401, host 101 writes the data into transmitter FIFO 312 via the legacy serial port compatible THR register. Host flow 423 then terminates at exit process 402.

Host-side peripheral controller flow 424 begins with event "Data Driven" 435, when data has been driven by peripheral controller 100 onto VPU bidirectional data bus VPU_D[7:0] 153. Flow then proceeds to process 403, where the peripheral controller updates the transmitter FIFO status to host 101. This status update occurs in a manner compatible with the legacy serial port standard, accounting for the data just provided on VPU_D[7:0] 153 from the transmitter FIFO. Flow then proceeds to process 404, where the peripheral controller waits for the host to write new data. Path 436 is repeatedly active until the host does write new data, whereupon path 437 is activated and flow continues to process 405. During process 405, the peripheral controller updates the transmitter FIFO status to reflect the host write that just occurred. Host-side peripheral controller flow 424 then terminates at exit process 406.

The host-side peripheral controller handshaking is illustrated by dashed arrows 433 and 434. When the peripheral controller provides data to the parallel peripheral, space for more data becomes available in the transmitter FIFO. Thus process 403, reflecting this available space in the update of the peripheral controller status to the host, enables process 400 to proceed along path 432, as indicated by dashed arrow 433. When the host writes data in process 401, process 404 is then enabled to proceed along path 437, as shown by dashed arrow 434.

The second process in the data movement from host 101 to parallel peripheral 109 is illustrated in peripheral-side flow 421. This includes peripheral-side peripheral controller flow 425 and parallel peripheral flow 426. Peripheral-side peripheral controller flow 425 event "VPU_RD# Assertion" 440 occurs when parallel peripheral 109 performs a read of transmitter FIFO 312. In response, flow proceeds to process 407, wherein the peripheral controller drives the next available transmitter FIFO data onto VPU_D[7:0] 153. Flow continues to process 408, where peripheral controller 100 deasserts the transmitter ready handshake VPU_TX_DA# 154. Flow then proceeds to process 409, where peripheral controller 100 waits for parallel peripheral 109 to deassert read strobe VPU_RD# 155. Peripheral controller 100 remains in process 409 via path 441 until VPU_RD# 155 is deasserted, exiting to process 410 via path 442. In process 410, VPU_D[7:0] 153 is floated.

Flow continues to process 411, where peripheral controller 100 waits for more data to transmit. Data may be immediately available for transmission, having been written earlier by host 101 (i.e. transmitter FIFO 312 is not empty), or data may not be available until another host write (i.e. transmitter FIFO 312 is empty). Peripheral controller 100 remains in process 411 via path 443 until there is more data for transmission (i.e. transmitter FIFO 312 is not empty). When data is available for transmission, flow proceeds along path 444 to process 412, wherein VPU_TX_DA# 154 is asserted, indicating to parallel peripheral 109 that additional data is available for transmission. Peripheral-side peripheral controller flow 425 then terminates at exit process 413.

Parallel peripheral flow 426 begins with event "Data Sink Ready for Data" 449. This occurs when parallel peripheral 109 is ready to obtain the next data from peripheral controller 100. Flow proceeds to process 414, where parallel peripheral 109 waits for assertion of VPU_TX_DA# 154, indicating data is available for reading from peripheral controller 100. Flow circulates back to process 414 via path 450 until VPU_TX_DA# 154 is asserted, whereupon flow proceeds to process 415 via path 451. In process 415, parallel peripheral 109 asserts data read strobe VPU_RD# 155, to initiate a read of transmitter FIFO 312.

Flow then proceeds to process 416, where parallel peripheral 109 waits for deassertion of ready handshake VPU_TX_DA# 154, indicating data is available for reading by parallel peripheral 109 on VPU_D[7:0] 153, via path 452. When VPU_TX_DA# 154 is deasserted, flow then proceeds along path 453 to process 417, wherein parallel peripheral 109 samples the data on VPU_D[7:0] 153. Flow continues to process 418, wherein parallel peripheral 109 deasserts read strobe VPU_RD# 155, indicating completion of the read transaction. Parallel peripheral flow 426 then terminates at exit process 419.

The peripheral-side peripheral controller handshaking is illustrated by dashed arrows 445, 446, 447, and 448. Assertion of VPU_RD# 155 in process 415 results in the event "VPU_RD# Assertion" 440, as shown by dashed arrow 445. The subsequent deassertion of VPU_TX_DA# 154 in process 408 affects process 416, where parallel peripheral 109 is waiting for the deassertion, as shown by dashed arrow 447. This handshake provides for reliable sampling of data transmitted from peripheral controller 100 to parallel peripheral 109 via VPU_D[7:0] 153.

The deassertion of VPU_RD# 155 in process 418, indicating completion of the read transaction, affects process 409, where peripheral controller 100 is waiting for the deassertion, as shown by dashed arrow 448. The subsequent assertion of VPU_TX_DA# 154 in process 412, indicating peripheral controller 100 has more data available for transmission, affects process 414, wherein parallel peripheral 109 is awaiting the assertion, as shown by dashed arrow 446. This handshake prevents underrun of transmitter FIFO 312 by parallel peripheral 109, as reads from parallel peripheral 109 only occur when valid data is available.

The internal peripheral controller handshaking between the host and peripheral sides of peripheral control 100 is illustrated by dashed arrows 438 and 439. Driving transmitter FIFO data onto VPU_D[7:0] 153 in process 407 initiates event "Data Driven" 435, as indicated by dashed arrow 438. Updating peripheral controller status in process 405, subsequent to a host write to transmitter FIFO 312, affects process 411, as shown by dashed arrow 439.

CONCLUSION

Although the present invention has been described using particular illustrative embodiments, it will be understood that many variations in construction, arrangement and use are possible consistent with the teachings and within the scope of the invention. For example, interconnect and function-unit bit-widths, clock speeds, and the type of technology used may generally be varied in each component block of the invention. Also, unless specifically stated to the contrary, the value ranges specified, the maximum and minimum values used, or other particular specifications, are merely those of the illustrative or preferred embodiments, can be expected to track improvements and changes in implementation technology, and should not be construed as limitations of the invention. Functionally equivalent techniques known to those of ordinary skill in the art may be employed instead of those illustrated to implement various components or sub-systems. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware).

Specific variations within the scope of the invention include, but are not limited to: the card or other electrical and mechanical structure embodying the peripheral controller, the type of computing device or parallel peripheral accessing the peripheral controller, and coupling between the peripheral controller and the parallel peripheral.

All such variations in design comprise insubstantial changes over the teachings conveyed by the illustrative embodiments. The names given to interconnect and logic are illustrative, and should not be construed as limiting the invention. It is also understood that the invention has broad applicability to other computing applications, and is not limited to the particular application or industry of the illustrated embodiments. The present invention is thus to be construed as including all possible modifications and variations encompassed within the scope of the appended claims.

What is claimed is:

1. A method for transferring data in association with a host and at least one of a parallel peripheral and a serial peripheral, the method comprising:
    handshaking host-side parallel data transfer from the host to a peripheral controller, the peripheral controller appearing to the host to include a legacy serial port accessible to host-based application and system software via a host-based legacy serial-port I/O driver, the host-side parallel data transfers comprising legacy serial-port compatible host reads from a receive FIFO and host-writes to a transmit FIFO;
    wherein the host-side handshaking comprises providing legacy serial port compatible peripheral controller status to the host;
    operating at least a portion of the peripheral controller in a mode that is a selected one of a parallel mode and a serial mode;
    in the parallel mode, handshaking peripheral-side parallel data transfer from the peripheral controller to the parallel peripheral, including providing peripheral controller status to the parallel peripheral;
    in the serial mode, handshaking peripheral-side serial data transfer from the peripheral controller to the serial peripheral,
    operationally selecting the mode at least in part based on a configuration register internal to the peripheral controller and writable by the host;
    independent of the operationally selected mode, operating the peripheral controller compatibly with the host-based legacy serial-port I/O driver to communicate between the peripheral controller and the host-based application and system software;
    loading the receive FIFO from the at least one peripheral via a selected one of two coupled receive circuitry interfaces in accordance with the operationally selected mode, respectively comprising
parallel reading from the parallel peripheral and loading the receive FIFO via parallel-data-transfer receive circuitry, and
serially reading from the serial peripheral and subsequently loading the receive FIFO via serial-data-transfer receive circuitry;
unloading the transmit FIFO to the at least one peripheral via a selected one of two coupled transmit circuitry interfaces in accordance with the operationally selected mode, respectively comprising
unloading the transmit FIFO and parallel writing to the parallel peripheral via parallel-data-transfer transmit circuitry, and
serially writing to the serial peripheral subsequent to unloading the transmit FIFO via serial-data-transfer transmit circuitry; and
wherein the host-side handshaking is at least partially in response to the peripheral-side handshaking, and the peripheral-side handshaking is at least partially in response to the host-side handshaking.

2. The method of claim 1, wherein the peripheral controller is implemented as a single board-level component, the peripheral-side parallel data transfer handshaking is via a first set of pins of the component, the peripheral-side serial data transfer handshaking is via a second set of pins of the component, and at least a portion of the first set of pins is in common with the second set of pins.

3. The method of claim 1, wherein the host directs selection between the parallel mode and the serial mode.

4. A peripheral controller comprising:
a host-side interface circuit having a host port and adapted to operate as a legacy serial port with respect to host information communicated with a host coupled to the host port, the host having host-based application and system software enabled to communicate with the peripheral controller via a host-based legacy serial-port I/O driver;
a peripheral-side interface circuit having a peripheral port and adapted to operate in accordance with an operationally selected one of a plurality of peripheral-side data-transfer types with respect to peripheral information, the peripheral information comprising peripheral-side data transfers and communicated with at least one peripheral coupled to the peripheral port;
data-transfer-type select circuitry to enable the peripheral-side interface circuit to communicate the peripheral-side data transfers with the at least one peripheral using an operationally selected peripheral-side data-transfer type of a group of peripheral-side data-transfer types;
wherein the group of peripheral-side data-transfer types comprises a parallel data-transfer type and a serial data-transfer type, and the peripheral-side interface circuit comprises parallel- and serial-data-transfer circuitries to respectively implement the parallel data-transfer type and the serial data-transfer type;
wherein the host information and the peripheral information are at least partially in response to each other;
wherein the peripheral controller is compatible with use of the host-based legacy serial-port I/O driver, independent of the operationally selected peripheral-side data-transfer type, to communicate between the peripheral controller and the host-based application and system software;
wherein the operationally selected peripheral-side data-transfer type is determined at least in part by the host by writing a configuration register; and
wherein the host-side interface circuit, the peripheral-side interface circuit, and the configuration register are collectively implemented as a single component.

5. The peripheral controller of claim 4, wherein the single component is a board-level component, and wherein the component further comprises a pin controlling selection of one of a plurality of host port operating modes.

6. The peripheral controller of claim 4, wherein the single component is a board-level component, the component further comprising a pin selectively configured to couple to a parallel peripheral when the peripheral-side interface circuit communicates the peripheral-side data transfers using the parallel data transfer type, and the pin being further selectively configured to couple to a serial peripheral when the peripheral-side interface circuit communicates the peripheral-side data transfers using the serial data-transfer type.

7. A peripheral controller used in conjunction with a host and at least one peripheral, the host having host-based application and system software in communication with the peripheral controller via a host-based legacy serial-port I/O driver, the at least one peripheral being of one type of the types parallel and serial, the peripheral controller comprising:
a host-side interface circuit having a host port adapted to couple to the host and operate as a legacy serial port with respect to host information exchanged with the host;
a peripheral-side interface circuit having a peripheral port adapted to couple to the at least one peripheral and operate in a selected one of a plurality of peripheral-side modes with respect to peripheral information exchanged with the at least one peripheral, the peripheral-side interface circuit comprising a plurality of data-transfer circuitries to implement the plurality of peripheral-side modes, the plurality of data-transfer circuitries comprising parallel-data-transfer circuitry and serial-data-transfer circuitry;
a configuration register writable by the host, the selected peripheral-side mode being determined at least in part via the configuration register;
data transfer-type-select circuitry to enable the peripheral-side interface circuit to communicate peripheral-side data transfers with the at least one peripheral using the selected peripheral-side mode;
wherein the peripheral-side modes comprise a parallel mode and a serial mode;
wherein the peripheral controller is compatible with use of the host-based legacy serial-port I/O driver, independent of the selected peripheral-side mode, to communicate between the peripheral controller and the host-based application and system software;
wherein the host information and the peripheral information are at least partially in response to each other; and
wherein the peripheral controller is implemented as a board-level component having a bus-mode pin coupled to a host-side bus-mode circuit of the host-side interface circuit, the bus-mode circuit adapted to operate the host port selectively according to a Cardbus mode and a Module mode as selected by the bus-mode pin.

8. The peripheral controller of claim 7, wherein the peripheral information comprises peripheral data and peripheral status.

9. The peripheral controller of claim 8, further comprising a dedicated parallel bus having a plurality of component pins dedicated to data transfer between the at least one peripheral and the peripheral-side interface circuit to communicate the peripheral data.

10. The peripheral controller of claim 9, further comprising pins separate from the parallel bus to communicate the peripheral status.

11. The peripheral controller of claim 7, wherein the configuration register is part of the host-side interface circuit.

12. The peripheral controller of claim 7, further comprising a shared pin selectively configured to couple to the at least one peripheral when the at least one peripheral is of the parallel type and the peripheral-side interface circuit operates in the parallel mode, and the shared pin being further selectively configured to couple to the at least one peripheral when the at least one peripheral is of the serial type and the peripheral-side interface circuit operates in the serial mode.

13. A peripheral controller used in conjunction with a host and at least one peripheral, the peripheral being of one type of the types parallel and serial, the peripheral controller comprising:
  a host-side interface circuit having a host port adapted to couple to the host and operate as a legacy serial port with respect to host information transacted with the host;
  a peripheral-side interface circuit having a peripheral port adapted to couple to the at least one peripheral and operate in a selected one of a plurality of peripheral-side modes with respect to peripheral information transacted with the peripheral;
  wherein the peripheral-side interface circuit comprises a respective data transfer circuit corresponding to each of the peripheral-side modes;
  data-transfer-type-select circuitry to enable the peripheral-side interface circuit to communicate peripheral-side data transfers with the peripheral in accordance with an operationally selected one of the peripheral-side modes;
  a configuration register that is writable by the host and determines at least in part the selected peripheral-side mode;
  wherein the peripheral-side modes comprise a parallel mode and a serial mode;
  wherein the peripheral controller is compatible with use of a host-based legacy serial-port I/O driver, independent of the selected peripheral-side mode, to communicate between the peripheral controller and host-based application and system software;
  wherein the host information and the peripheral information are at least partially in response to each other; and
  wherein the peripheral controller is implemented as a board-level component having a plurality of pins, a subset of the pins being configurable to couple to the peripheral when the peripheral is of the parallel type and the selected peripheral-side mode is the parallel mode, and the subset of the pins being further configurable to couple to the peripheral when the peripheral is of the serial type and the selected peripheral-side mode is the serial mode.

14. The peripheral controller of claim 13, wherein the data transfer circuit corresponding to the parallel mode comprises circuitry enabled, when the peripheral is of the parallel type, to provide parallel access from the peripheral to a receiver FIFO, and to provide parallel access from a transmitter FIFO to the peripheral; and wherein the data transfer circuit corresponding to the serial mode comprises circuitry enabled, when the peripheral is of the serial type, to provide legacy serial port compatible serial access from the peripheral to the receiver FIFO, and to provide legacy serial port access from the transmitter FIFO to the peripheral.

15. The peripheral controller of claim 13, wherein the host port is selectively operable in a first mode when a host-port mode pin is in a first state and selectively operable in a second mode when the host-port mode pin is in a second state.

16. A method comprising:
  communicating host-side information from a host to a peripheral controller that appears to the host to operate as a legacy serial port, the host side information comprising legacy serial-port compatible host reads from a receive FIFO and host writes to a transmit FIFO, the host having host-based application and system software communicating with the peripheral controller via a host-based legacy serial-port I/O driver;
  communicating peripheral-side information from the peripheral controller to at least one peripheral according to an operationally selected one of a plurality of peripheral-side data-transfer-types comprising a parallel-data-transfer-type and a serial-data-transfer-type, the parallel-data-transfer-type being implemented by parallel-data-transfer receive circuitry and parallel-data-transfer transmit circuitry, the serial-data-transfer type being implemented by serial-data-transfer receive circuitry and serial-data-transfer transmit circuitry;
  independent of the operationally selected peripheral-side data-transfer-type, operating the peripheral controller compatibly with the host-based legacy serial-port I/O driver to communicate between the peripheral controller and the host-based application and system software;
  loading the receive FIFO from the at least one peripheral via a selected one of two coupled receive circuitry interfaces in accordance with the operationally selected peripheral-side data-transfer-type, respectively comprising parallel reading from the at least one peripheral and loading the receive FIFO via the parallel-data-transfer receive circuitry, and serially reading from the at least one peripheral and subsequently loading the receive FIFO via the serial-data-transfer receive circuitry;
  unloading the transmit FIFO to the at least one peripheral via a selected one of two coupled transmit circuitry interfaces in accordance with the operationally selected peripheral-side data-transfer-type, respectively comprising unloading the transmit FIFO and parallel writing to the at least one peripheral via the parallel-data-transfer transmit circuitry, and serially writing to the at least one peripheral subsequent to unloading the transmit FIFO via the serial-data-transfer transmit circuitry;
  wherein the peripheral-side information communicating is at least partially in response to the host-side information communicating; and
  wherein the operationally selected peripheral-side data-transfer-type is chosen at least in part based on the host writing a configuration register internal to the peripheral controller.

17. The method of claim 16, wherein the host-side information communicating is according to a selected one of a plurality of host-side bus modes, and the selected host-side bus mode is determined by a pin of a board-level component implementing the peripheral controller.

18. The method of claim 16, wherein at least one pin of a board-level component implementing the peripheral controller is configured to couple to a parallel peripheral when the selected peripheral-side data-transfer-type is the parallel-data-transfer-type, and the at least one pin is configured to couple to a serial peripheral when the selected peripheral-side data-transfer-type is the serial-data-transfer-type.

19. The method of claim 16, wherein:
the host-side information is host-side-to-peripheral information; and
the peripheral-side information is peripheral-side-to-peripheral information; and further comprising
communicating peripheral-side-to-host information from the at least one peripheral to the peripheral controller according to the selected peripheral-side data-transfer-type; and
communicating host-side-to-host information from the peripheral controller to the host.

20. A method comprising:
conveying host-side information from a host to a peripheral controller that appears to application and system software executing on the host to operate as a legacy serial port, the application and system software accessing the peripheral controller via a host-based legacy serial-port I/O driver, the conveying host-side information being independent of an operationally selected peripheral-side mode;
conveying peripheral-side information from the peripheral controller to a peripheral according to the operationally selected peripheral-side mode, the operationally selected peripheral-side mode being a selected one of a plurality of peripheral-side modes comprising a parallel mode and a serial mode;
operationally selecting the operationally selected peripheral-side mode at least in part based on a configuration register internal to the peripheral controller and writable by the host;
loading a receive FIFO of the peripheral controller from the peripheral via a selected one of a plurality of receive circuitry interfaces in accordance with the operationally selected peripheral-side mode, the receive circuitry interfaces comprising a parallel receive circuitry interface enabled to load the receive FIFO by parallel reading of the peripheral, the receive circuitry interfaces further comprising a serial receive circuitry interface enabled to load the receive FIFO by serially reading the peripheral;
unloading a transmit FIFO of the peripheral controller to the peripheral via a selected one of a plurality of transmit circuitry interfaces in accordance with the operationally selected peripheral-side mode, the transmit circuitry interfaces comprising a parallel transmit circuitry interface enabled to unload the transmit FIFO and to parallel write to the peripheral, the transmit circuitry interfaces further comprising a serial transmit receive circuitry interface enabled to unload the transmit FIFO and to serially write to the peripheral;
wherein the peripheral-side information conveying is at least partially in response to the host-side information conveying; and
wherein the host-side information conveying is according to a selected one of a plurality of host-side bus modes, and the selected host-side bus mode is determined by a bus mode pin included on a board-level component implementing the peripheral controller.

21. The method of claim 20, wherein the peripheral-side information conveying comprises data transferring via a dedicated parallel bus having a plurality of data lines between the peripheral and the peripheral controller.

22. The method of claim 20, wherein the peripheral-side information conveying comprises handshaking of peripheral-side data transfers.

23. The method of claim 22, wherein the peripheral-side handshaking of data transfers comprises the peripheral controller examining a data-available indicator.

24. The method of claim 23, wherein the data-available indicator is a board-level interface signal.

25. The method of claim 23, wherein the peripheral samples parallel data from the peripheral controller in response to de-assertion of the data-available indicator.

26. The method of claim 20, further comprising the host writing the configuration register.

27. The method of claim 20, wherein at least one shared pin included on the component is configured to couple to a parallel peripheral when the operationally selected peripheral-side mode is the parallel mode, and the at least one shared pin is configured to couple to a serial peripheral when the operationally selected peripheral-side mode is the serial mode.

28. A method comprising:
transmitting host-side information from a host to a peripheral controller that appears to the host to operate as a legacy serial port when accessed by host-based application and system software via a host-based legacy serial-port I/O driver, at least when the peripheral controller is operating in either a parallel peripheral-side mode or a serial peripheral-side mode;
transmitting peripheral-side information from the peripheral controller to a peripheral according to a selected one of a plurality of peripheral-side modes comprising the parallel peripheral-side mode and the serial peripheral-side mode;
selecting the peripheral-side mode during operation based at least in part on a configuration register internal to the peripheral controller and writable by the host;
loading a receive FIFO of the peripheral controller from the peripheral via a parallel receive circuitry interface when the peripheral controller is operating in the parallel peripheral-side mode at least in part by parallel reading the peripheral and loading the receive FIFO via the parallel receive circuitry interface;
loading the receive FIFO of the peripheral controller from the peripheral via a serial receive circuitry interface when the peripheral controller is operating in the serial peripheral-side mode at least in part by serially reading the peripheral and loading the receive FIFO via the serial receive circuitry interface;
unloading a transmit FIFO of the peripheral controller to the peripheral via a parallel transmit circuitry interface when the peripheral controller is operating in the parallel peripheral-side mode at least in part by unloading the transmit FIFO and parallel writing to the peripheral;
unloading the transmit FIFO of the peripheral controller to the peripheral via a serial transmit circuitry interface when the peripheral controller is operating in the serial peripheral-side mode at least in part by unloading the transmit FIFO and serially writing to the peripheral;
wherein the peripheral-side information transmitting is at least partially in response to the host-side information transmitting; and
wherein at least one shared pin included on a board-level component implementing the peripheral controller is configured to couple to a parallel peripheral when the selected peripheral-side mode is the parallel peripheral-side mode, and the at least one shared pin is configured to couple to a serial peripheral when the selected peripheral-side mode is the serial peripheral-side mode.

29. The method of claim 28, further comprising the host writing the configuration register.

30. The method of claim 28, wherein the host-side information transmitting is according to a selected one of a plurality of host-side bus modes, and the selected host-side bus mode is determined by a bus mode pin included on the component.

* * * * *